US011092080B2

(12) United States Patent
McDeed (10) Patent No.: US 11,092,080 B2
(45) Date of Patent: Aug. 17, 2021

(54) SYSTEMS AND METHODS FOR STARTING GAS TURBINES

(71) Applicant: Mitsubishi Power Americas, Inc., Lake Mary, FL (US)

(72) Inventor: David McDeed, Altamonte Springs, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 16/689,296

(22) Filed: Nov. 20, 2019

(65) Prior Publication Data

US 2021/0148284 A1   May 20, 2021

(51) Int. Cl.
*F02C 7/26* (2006.01)
*H02P 9/08* (2006.01)
*H02P 101/25* (2016.01)

(52) U.S. Cl.
CPC ............... *F02C 7/26* (2013.01); *H02P 9/08* (2013.01); *F05D 2220/32* (2013.01); *H02P 2101/25* (2015.01)

(58) Field of Classification Search
CPC ...................... F02C 7/26; H02P 9/08
See application file for complete search history.

(56) References Cited

U.S. PATENT DOCUMENTS

| 3,098,626 A * | 7/1963 | Messinger | F02C 7/277 244/53 A |
| 3,579,087 A * | 5/1971 | Reinert | H02P 9/08 322/28 |
| 4,079,443 A * | 3/1978 | Udvardi-Lakos | H02M 7/5155 307/66 |
| 8,631,275 B2 | 1/2014 | Opina, Jr. et al. | |

(Continued)

FOREIGN PATENT DOCUMENTS

EP    3247037 A1    11/2017

OTHER PUBLICATIONS

"Stadtwerke Munchen Increases Energy Efficiency and Flexibility with GE's Environmentally Friendly District Heating Plant Upgrades in Germany", GE Reports Accessed on Dec. 6, 2019 https://www.genewsroom.com/press-releases/stadtwerke-müunchen-increases-energy-efficiency-and-flexibility-ge's-0, (Aug. 8, 2019), 3 pgs.

*Primary Examiner* — Sean Gugger
(74) *Attorney, Agent, or Firm* — Schwegman Lundberg & Woessner, P.A.

(57) ABSTRACT

Systems and methods for starting a gas turbine engine can comprise a generator to be driven by the gas turbine engine to supply power to a grid system, a first switch to electrically couple and decouple the generator from the grid system, a first static frequency converter having a first capacity, a second static frequency converter having a second capacity, control means for electrically coupling and decoupling the first and second static frequency converters from the grid system, a synchronizer and a controller configured to oper- (Continued)

ate the generator as a starter-motor with power from: the first static frequency converter to turn the gas turbine engine at a first rate sufficient to start the gas turbine engine within a first time period or the first static frequency converter and the second static frequency converter in synchronization to turn the gas turbine engine at a second rate greater than the first rate.

20 Claims, 6 Drawing Sheets

(56) References Cited

U.S. PATENT DOCUMENTS

| | | | | |
|---|---|---|---|---|
| 2004/0245783 | A1* | 12/2004 | Gilbreth | H02J 1/10 290/52 |
| 2006/0220387 | A1* | 10/2006 | Tsuzuki | H02P 9/04 290/52 |
| 2009/0251109 | A1* | 10/2009 | Larsen | H02P 9/08 322/10 |
| 2011/0106325 | A1* | 5/2011 | Opina, Jr. | H02J 3/386 700/287 |
| 2011/0146290 | A1* | 6/2011 | Vernet | F02C 7/26 60/778 |
| 2011/0146293 | A1* | 6/2011 | Shartzer | F01D 15/10 60/778 |
| 2012/0098261 | A1* | 4/2012 | Rozman | F02N 11/006 290/31 |
| 2014/0265972 | A1* | 9/2014 | Xu | H02M 7/493 318/400.42 |
| 2019/0260299 | A1* | 8/2019 | Hildebrandt | H02P 1/52 |
| 2020/0200035 | A1* | 6/2020 | Nair | G01M 15/14 |

* cited by examiner

SYSTEMS AND METHODS FOR STARTING GAS TURBINES

TECHNICAL FIELD

This document pertains generally, but not by way of limitation, to systems and methods for starting gas turbine engines. More specifically, but not by way of limitation, the present application relates to systems and methods for starting gas turbine engines using power from a grid system ("the grid") to drive an electrical generator as a starter motor.

BACKGROUND

Power plants typically supply power to a grid system within a distributed network where voltage is provided at a constant amplitude or magnitude and frequency is maintained at a certain value within limits. However, when the load on the grid system changes sufficiently, such as during a load imbalance event, the system voltage or frequency will change from the controlled values.

In some scenarios, it can be desirable to rapidly bring additional power on-line from additional power plants not previously operating in order to meet demand that cannot be met by already on-line power plants. In some power plants, electricity from the grid can be used to bring the power plant on-line before electricity production can take place. For example, electricity can be used to operate an electrical generator as a starter-motor to spin up a gas turbine engine to obtain its operating speed. In order for the electrical generator to be operated as a motor, it should be provided with current at a frequency compatible with the speed of the electrical generator. Frequency converters, such as static frequency converters (SFCs) and load commutated inverter (LCIS) can be used to provide this function. Typical frequency converters used in this manner are designed for a specific power capacity to provide a desired acceleration rate of increasing RPM per second to drive the generator and subsequently the gas turbine.

Recent trends include a desire by power plant operators to reduce (i.e., have faster) turbine starting times, in order to be more responsive to requests from the grid to, for example, increase power output, which can result from increased use and unpredictability of renewable power sources. As an example, four RPM/second is a typical "normal" starting ramp rate and nine RPM/second is typical "fast" starting ramp rate. Increased rates of change of speed can require larger and more expensive frequency converter systems. Fast starts can be economically advantageous to grid operators to facilitate allocation of power based on changing grid needs to maintain or allow for efficient energy production.

Examples of gas turbine engine systems using inverters or converters are described in U.S. Pat. No. 5,783,932 to Mamba et al.; Pub. No. US 2011/0146293 to Shartzer et al.; and Pat. No. EP 3 247 037 A1 to Deuringer et al.

OVERVIEW

Figure 2:
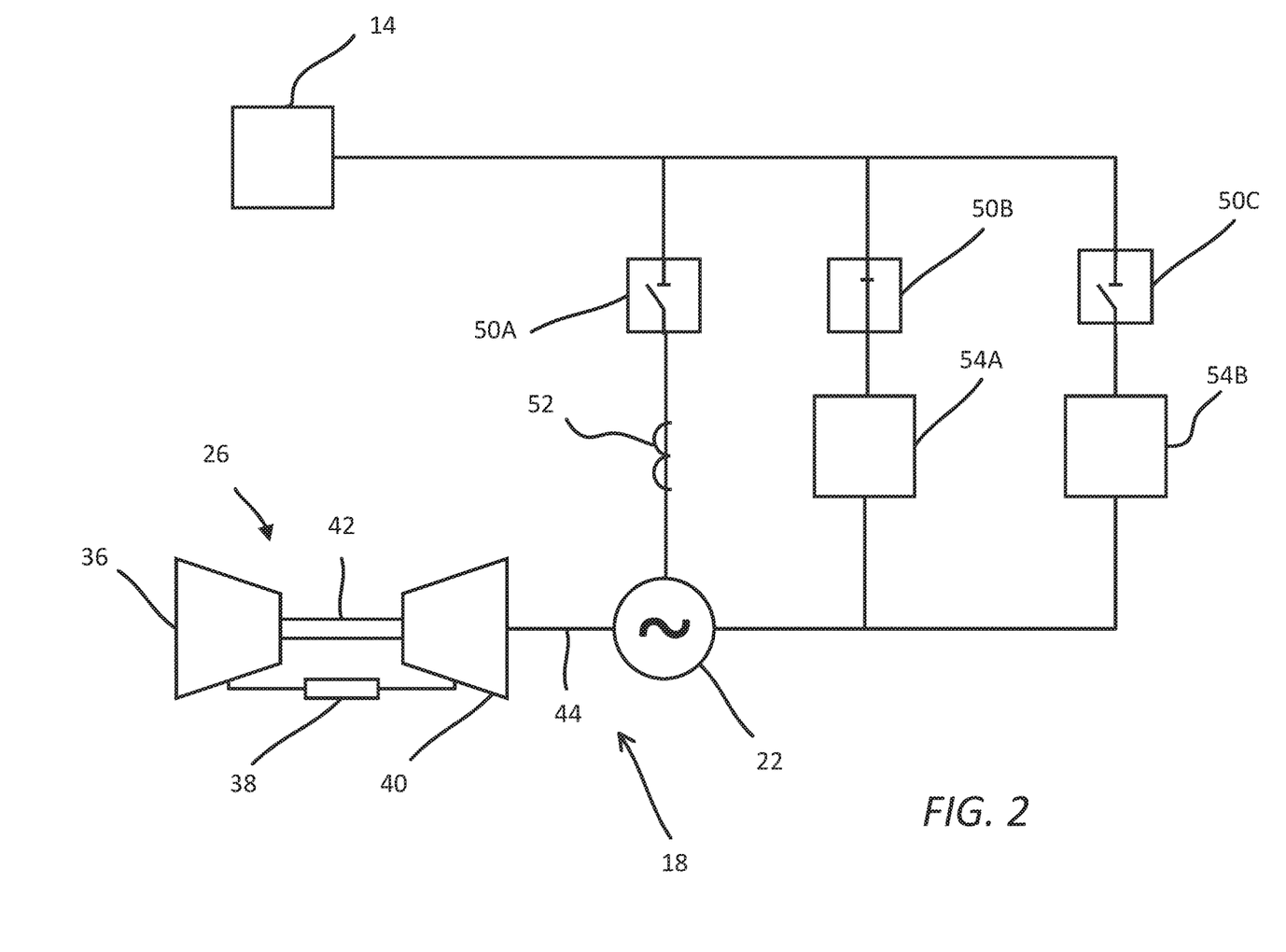
FIG. 2 is a schematic diagram illustrating a gas turbine engine system connected to a grid system via a plurality of switches, a transformer and a pair of first frequency converters.

The present inventor has recognized, among other things, that problems to be solved in starting gas turbine engines is the added expense that can be incurred to provide frequency converters, such as static frequency converters. Facilities can typically be provided with two parallel redundant systems, as shown in FIG. 2, with each providing 100% of the capacity needed for the maximum ("fast" start) operational scenario. Therefore, if one system fails or is not operable, its functionality can be provided by the other, redundant system. Providing a redundant system significantly increases costs, as well as physical installation space.

Because the capacity of each converter system is sized for operation at the fast rate, the converter system can operate at its maximum capacity for fast starts, or at a lower capacity for slower starts, depending on the needs of the grid. Stated alternatively, operation at the "normal" ramp rate results in an unused capacity within a converter sized for the fast rate. For fast start systems the costs of the one large system is high. Because the fast start systems are not always required to start fast, they include excessive capacity for some of the operational needs, e.g., those times when the normal start is desired. If redundancy is needed to eliminate the single point of failure, then the total costs are much higher to include a second system.

Figure 3:
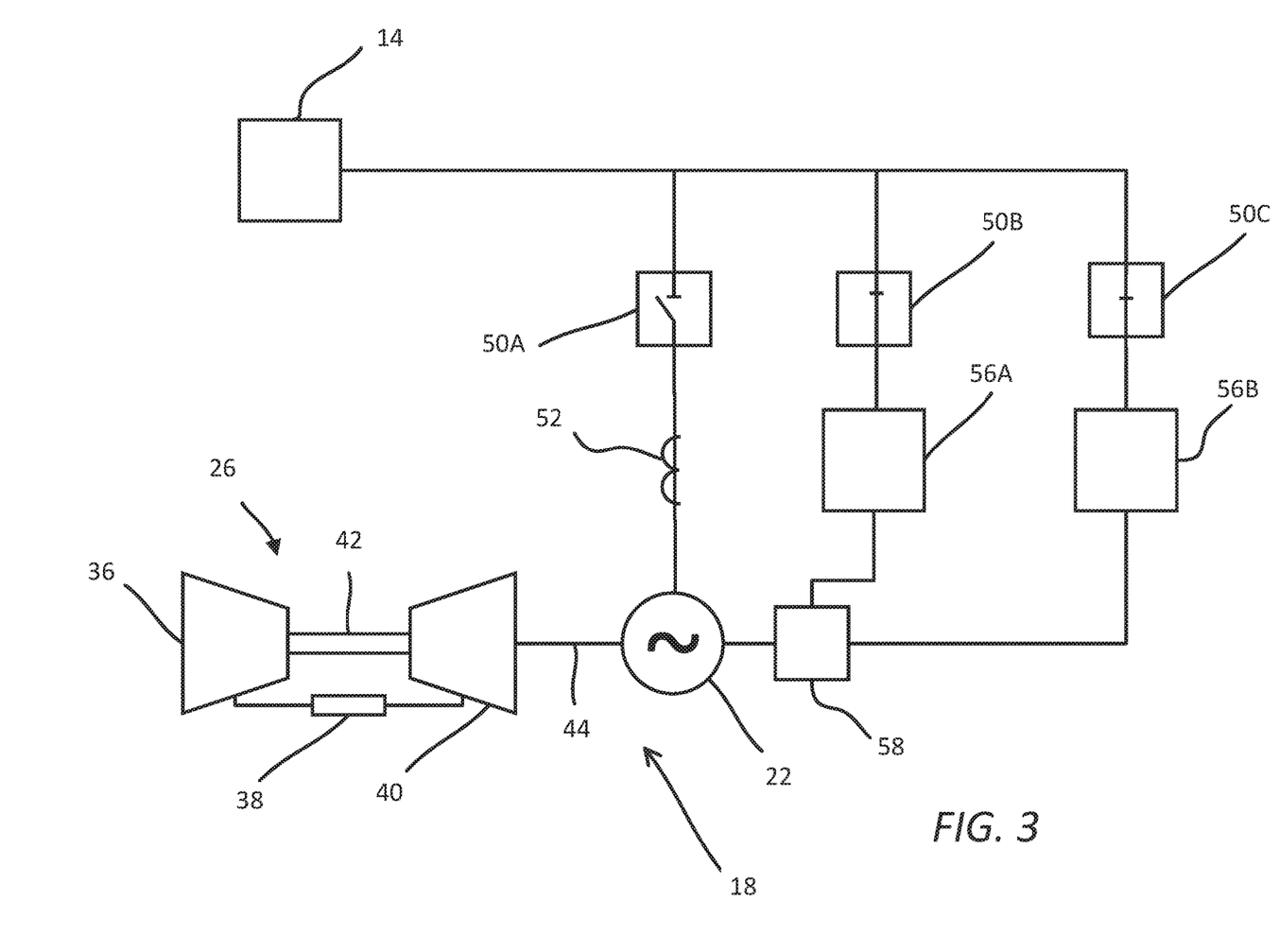
FIG. 3 is a schematic diagram illustrating a gas turbine engine system connected to a grid system via a plurality of switches, a transformer and a pair of second frequency converters.
Figure 4:
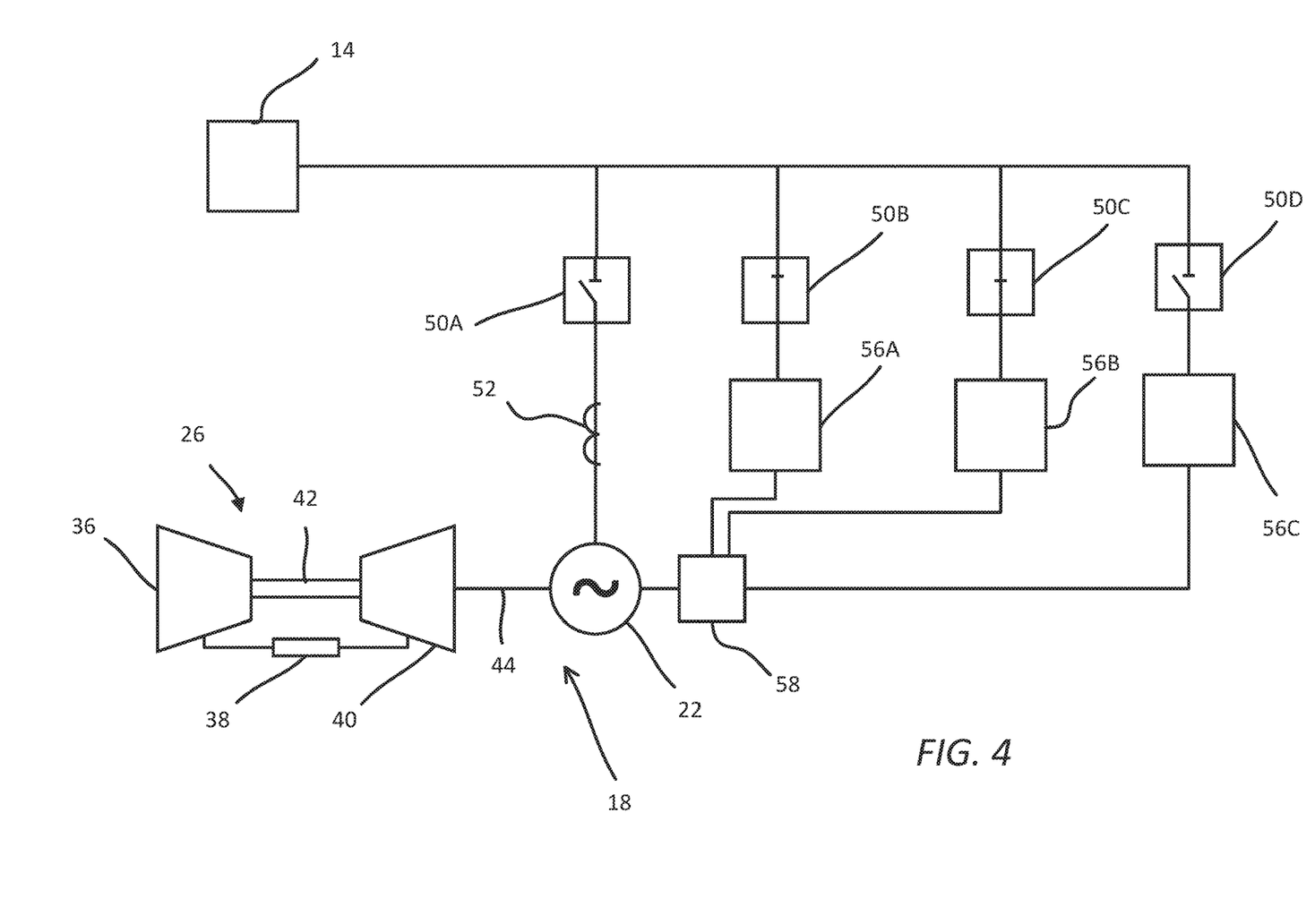
FIG. 4 is a schematic diagram illustrating a gas turbine engine system connected to a grid system via a plurality of switches, a transformer and a trio of the second frequency converters.

The present subject matter can provide solutions to this problem and other problems, such as by providing methods and systems for operating frequency converters in parallel for start-up operations for fast starts and operating a single static frequency converter for normal starts. This concept can consist of a designing a power plant facility with multiple frequency converters, that facilitate normal starts independently; but when faster starts are desired, a second frequency converter can operate in parallel to achieve the desired fast ramp rate. This redundancy can be in a 2×~50% capacity, as shown in FIG. 3, to provide single point of failure redundancy for a normal starting ramp rate, or a 3×~50% capacity, as shown in FIG. 4, to provide a single point of failure redundancy for fast starting ramp rate (with two points of failure redundancy for normal starting ramp rate).

In an example, a method for starting a gas turbine engine can comprise electrically decoupling a generator configured to be driven by the gas turbine engine from a power supply, controlling power from the power supply to a first static frequency converter having a first capacity, controlling power from the power supply to a second static frequency converter having a second capacity, and operating the generator as a starter-motor with power from at least one of 1) the first static frequency converter to turn the gas turbine engine at a first rate sufficient to start the gas turbine engine within a first time period, and 2) the first static frequency converter and the second static frequency converter to turn the gas turbine engine at a second rate greater than the first rate.

In another example, a method for fast-starting a gas turbine engine configured to drive a generator to supply power to a grid can comprise providing power from the grid to a first static frequency converter, the first static frequency converter having a first capacity, providing power from the grid to a second static frequency converter, the second static frequency converter having a second capacity, synchronizing output of the first and second static frequency converters, and operating the generator as a starter-motor with power from the first static frequency converter and the second static frequency converter to turn the gas turbine engine at a first rate sufficient to start the gas turbine engine within a first time period.

In an additional example, a gas turbine engine system can comprise a gas turbine engine, a generator configured to be driven by the gas turbine engine to provide power to a grid system, a first switch to electrically couple and decouple the generator from the grid system, a first static frequency converter having a first capacity, a second static frequency converter having a second capacity equal to the first capacity, a synchronizer to synchronize output of the first and second static frequency converters, and a controller configured to A) electrically couple and decouple the first and second static frequency converters from the grid system, B) control synchronization of the first and second static frequency converters, and C) operate the generator as a starter-motor with power from 1) the first static frequency converter to turn the gas turbine engine at a first rate sufficient to start the gas turbine engine within a first time period, or 2) the first static frequency converter and the second static frequency converter to turn the gas turbine engine at a second rate greater than the first rate.

This overview is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
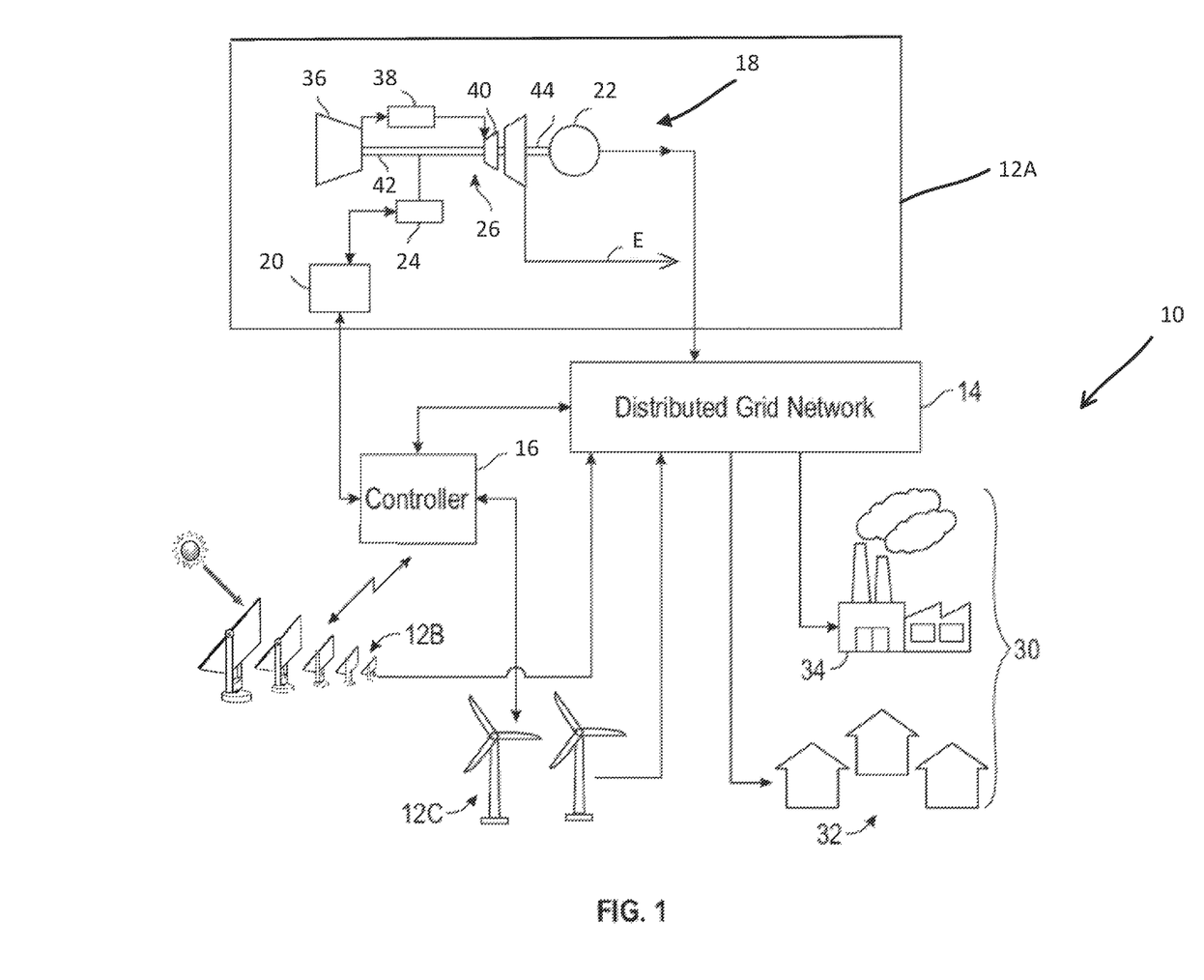
FIG. 1 is a schematic diagram of a power system illustrating multiple power plants configured to provide electrical power to a distributed grid network (DGN) or "grid."

FIG. 1 is a schematic diagram of power system 10 illustrating power plants 12A, 12B, and 12C providing electrical power to distributed grid network (DGN) or "grid" 14, which can include controller 16. Power plant 12A can include generator unit 18 and controller 20. Generator unit 18 can comprise electrical generator 22, engine controller 24, such as a Distributed Control Systems (DCS) device, and gas turbine 26. DGN 14 can be configured to deliver power from electrical generator 22, as well as power from power plants 12B and 12C, to end users 30, which can include residential housing units 32 and factory 34, for example.

As is known in the art, gas turbine 26 can operate by compressing air with a compressor and burning fuel within the compressed air to generate high energy gases that pass through a turbine that produces rotational shaft power to drive an electrical generator. Gas turbine 26 can include compressor 36, combustor 38, turbine 40, turbine shaft 42 and output shaft 44. In examples, power plant 12A can comprise a simple-cycle system in which gas turbine 26 directly generates electrical power with electrical generator 22 without integration into a combined cycle power plant that utilizes, for example, a Heat Recovery Steam Generator (HRSG) (not shown). Exhaust gas E of gas turbine 26 can, thus, be vented to atmosphere, such as after being treated for emissions, such as by using a Selective Catalytic Reduction (SCR) system (not shown). In other examples, gas turbine 26 can be co-operated with other gas turbines that drive other electrical generators. Additionally, in other configurations, gas turbine 26 can be used in a combined-cycle system such as with a HRSG to utilize the hot exhaust gas E to produce gas, such as steam, for driving an additional turbine that can drive an additional electrical generator.

Engine controller 24 can control the amount of fuel that is delivered to combustor 38, thereby controlling the power output of gas turbine 26 and thus influence the rotational speed of turbine shaft 42. Engine controller 24 can operate the output of gas turbine 26 such that the speed of turbine shaft 42 operates at a control frequency of system 10 under steady state operating conditions to maintain balance between load and supply of power on the DGN. In additional examples, engine controller 24 can operate gas turbine 26 to initiate rotation of turbine shaft 42 from a non-operating state, e.g., during a start-up operation.

The present disclosure is directed to systems and methods for controlling power delivery from DGN 14 to electrical generator 22, particularly during start-up operations. During load imbalance situations, such as when another power plant, such as one of power plants 12B or 12C goes off-line, particularly in a sudden fashion, or when factory 34 goes on-line, particularly in a sudden fashion, it can be desirable to bring power plant 12A on-line in a rapid manner. In other scenarios, it can be desirable to bring power plant 12A on-line rapidly when conditions arise that can lead to loss of power or reduced power from wind turbine power plants or solar power plants.

Engine controller 24 can cooperate with controller 20 to operate generator unit 18 to bring gas turbine 26 up to speed rapidly. If power plant 12A is off-line, power from the grid 14 can be used to start-up power plant 12A, particularly gas turbine 26, in order to bring generator 22 on-line. In such a scenario, electrical generator 22 can utilize electrical input from grid 14 to operate as a starter-motor for gas turbine 26, such as until gas turbine 26 is rotating at a speed sufficient to self-sustain operation.

However, in order to operate electrical generator 22 as both a starter-motor and an electrical generator, generator unit 18 can be provided with additional components, such as transformers, switches, frequency converters and synchronizers, as will be explained in detail with reference to FIGS. 2-5.

FIG. 2 is a schematic diagram illustrating gas turbine 26 and generator 22 of generator unit 18 connected to grid 14 via a plurality of switches 50A, 50B and 50C, transformer 52 and first frequency converters 54A and 54B. Gas turbine 26 can include compressor 36, combustor 38, turbine 40, turbine shaft 42 and output shaft 44. Frequency converter 54A and frequency converter 54B can be arranged in parallel with each being provided one of switches 50B and 50C, respectively.

When gas turbine 26 is operating, switch 50I can be closed such that electricity generated by electrical generator 22 can flow to grid 14. The electricity first is directed through transformer 52, which can convert the electricity to voltages compatible with grid 14. In such operating conditions, switches 50B and 50C can be opened such that current does not flow through first frequency converters 54A and 54B.

When gas turbine 26 is not operating, such as during evening (e.g., nighttime) or grid conditions where power demand is low, switches 50A-50C can be open. Switches 50A-50C can comprise any suitable device for opening and closing an electrical connection, such as a breaker and the like. Switches 50A-50C can be configured to be remotely operated via electrical actuation, such as from controller 24. Gas turbine 26 can be shut down or wound down to a non-operating condition where fuel is not being provided to combustor 38 and shafts 42 and 44 are no longer or not spinning.

When grid controller 16 (FIG. 1) instructs power plant 12A (FIG. 1) to come on-line, one of switches 50B and 50C can be closed (as illustrated in FIG. 2) to connect one of first frequency converters 54A and 54B to grid 14. Frequency converters 54A and 54B can be configured as redundant systems where one of frequency converters 54A and 54B backs-up the other in case of a failure or inability to operate. As such either of frequency converters 54A and 54B can be used for starting gas turbine 26. Each of frequency converters 54A and 54B have sufficient capacity to enable either a fast start or a normal start, and therefore only one of frequency converters 54A and 54B is necessary to be used for either a fast start or a normal start. Thus, redundancy is provided for normal and fast start operations in case of inoperability of one of frequency converters 54A and 54B.

Frequency converters 54A and 54B can be configured to receive power from grid 14 at a fixed frequency of grid 14 and match the frequency to generator 22 as it spins up through various speeds from a very low speed to a high speed. In an example, generator 22 can begin at a low speed of approximately three revolutions per minute (RPM) to a high speed of approximately 2,700 RPM (e.g., a "generation speed"). As will be discussed later, combustor 38 can begin to operate (e.g. igniters 80 (FIG. 5) can begin a flame within combustor 38) at approximately 600 RPM. Frequency converters 54A and 54B can comprise any suitable device for providing such functionality, such as a static frequency converter (SFC) or a load commutated inverter (LCI). Frequency converters 54A and 54B can be sized for the configuration of gas turbine and electrical generator to which they are connected. In particular, frequency converters 54A and 54B can be sized to increase the rate of rotation of gas turbine 26 at a desired rate via the generator/motor, with higher or faster rates resulting in more complex, more expensive configurations of frequency converters. As such, frequency converters are typically sized for the fastest start rate at which generator unit 18 is constructed or intended to operate at. In an example, frequency converters 54A and 54B are each sized at approximately thirty megawatt (MW) capacity to provide fast start-up capabilities for a gas turbine unit. However, fast starts are in general more costly to initiate than slower starts due to increased wear on the components of gas turbine 26 and associated pumps and motors. As such, if a fast start is not called for by grid controller 16 (FIG. 1), engine controller 24 will typically start gas turbine at the slower, normal start rate.

For a conventional arrangement of generator unit 18, each of frequency converters would be configured to have capacity for fast starting of gas turbine 26. Accordingly, the combined capacity of frequency converters 54A and 54B is 2× the fast start capability and 4× the normal start capability. As described above, this can result in much of the capacity of each frequency converter 54A and 54B not being utilized most of the time. With the systems and methods of the present disclosure, a pair of parallel frequency converters can be sized to provide capacity for less than a fast start such that normal starts utilize all or most of the capacity of the frequency converter, and fast starts can be performed utilizing both frequency converters in parallel.

FIG. 3 is a schematic diagram illustrating gas turbine 26 and generator 22 of generator unit 18 connected to grid 14 via a plurality of switches 50A, 50B and 50C, transformer 52, second frequency converters 56A and 56B and synchronizer 58. Gas turbine 26 can include compressor 36, combustor 38, turbine 40, turbine shaft 42 and output shaft 44. Frequency converter 56A and frequency converter 56B can be arranged in parallel with each being provided one of switches 50B and 50C, respectively. Generator unit 18 of FIG. 3 can be configured the same as generator unit 18 of FIG. 2, with frequency converters 56A and 56B replacing frequency, converters 54A and 54B. Like frequency converters 54A and 54B, frequency converters 56A and 56B, can comprise any suitable device for providing frequency conversion functionality, such as a static frequency converter (SFC) or a load commutated inverter (LCI). Frequency converters 56A and 56B can be sized to have approximately half the capacity as frequency converters 54A and 54B. In an example, frequency converters 56A and 56B are each sized at approximately fifteen megawatt (MW) capacity to provide normal start-up capabilities for a gas turbine unit. However, frequency converters 56A and 56B can be sized to be greater than fifty percent of the capacity of converters 54A and 54B, such as sixty percent, to provide an operating margin.

When gas turbine 26 is operating, switch 50A can be closed such that electricity generated by electrical generator 22 can flow to grid 14. The electricity first is directed through transformer 52 that can convert the electricity to voltages compatible with grid 14. In such operating conditions, switches 50B and 50C can be opened such that current does not flow through first frequency converters 54A and 54B.

When gas turbine 26 is not operating, such as during evening nighttime), or grid conditions where power demand is low, switches 50A-50C can be open. Gas turbine 26 can be shut down.

When grid controller 16 (FIG. 1) instructs power plant 12A (FIG. 1) to come on-line, power plant controller 20 (FIG. 1) can determine if instructions should be provided to engine controller 24 for a normal start or a fast start.

If a fast start is instructed, both of switches 50B and 50C can be closed to connect both of first frequency converters 56A and 56B to grid 14. Frequency converters 56A and 56B can be configured as complimentary systems that work together to start gas turbine 26. As such, both of frequency converters 56A and 56B can be used for starting gas turbine 26 in a fast start operation. In example embodiments, frequency converters 56A and 56B can be connected to a synchronizer 58 to synchronize frequency output of frequency converters 56A and 56B.

If a normal start is instructed, one of switches 50B and 50C can be closed to connect only one of first frequency converters 56A and 56B to grid 14. Frequency converters 56A and 56B can be configured as redundant systems where one of frequency converters 56A and 56B backs-up the other in case of a failure or inability to operate. As such either of frequency, converters 56A and 56B can be used for starting gas turbine 26 in a normal start operation. Together, frequency converters 56A and 56B can provide 1× the fast start capability and 2× normal start capability. Thus, redundancy is provided for normal start operations in case of inoperability of one of frequency converters 54A and 54B, but not fast start operations. Configured as such, the total cost of the starting system shown in FIG. 3 for gas generator unit 18 can be reduced compared to that of FIG. 2, as less complex and smaller capacity frequency converters can be used, which can be less expensive to acquire.

FIG. 4 is a schematic diagram illustrating gas turbine 26 and generator 22 of generator unit 18 connected to grid 14 via a plurality of switches 50A, 50B and 50C, transformer 52, a trio of frequency converters 56A, 56B and 56C and synchronizer 58. Gas turbine 26 can include compressor 36, combustor 38, turbine 40, turbine shaft 42 and output shaft 44. Frequency converters 56A, 56B and 56C can be arranged in parallel with each being provided one of switches 50B, 50C and 50D, respectively. Generator unit 18 of FIG. 4 can be configured the same as generator unit 18 of FIG. 3, with the addition of frequency converter 56C being added in parallel with frequency converters 56A and 56B and the inclusion of switch 50D. In examples, frequency converters 56A-56C can be connected to synchronizer 58 to synchronize frequency output of frequency converters 56A 56C. Frequency converter 56C can be sized to have approximately half the capacity as frequency converters 54A and 54B. Together, frequency converters 56A, 56B and 56C can provide 1.5× the fast start capability and 3× the normal start capability. Thus, redundancy is provided for normal and fast start operations in case of inoperability of one of frequency converters 56A, 56B and 56C. Configured as such, the total cost of gas generator unit 18 can be reduced compared to that of FIG. 2, as less complex and smaller frequency converters can be used, which can be less expensive to acquire, while additionally retaining fast start capabilities in the event of a single point of failure.

In additional examples of the present disclosure, more than three frequency converters can be used in generator unit 18. Further, frequency converters, such as frequency converters 56A, 56B and 56C, can be sized in capacities other than 50% of frequency converters 54A and 54B. Alternate combinations of SFCs can be arranged for various capabilities as desired by the owner/designer to share the fast or normal starting capability among any combination of them. For example, four frequency converters of 25% capacity of frequency converters 54A and 54B could be used. Such a configuration would provide redundancy for normal starts and would further provide the option of starting gas turbine 26 at three start speeds, e.g., normal start using two frequency converters, fast start using four frequency converters, and an intermediate start using three frequency converters. Other combinations of the number and capacity of frequency converters can be used including mixing of frequency converters of different capacities. For example, one of frequency converters 54A and 54B could be paired with one or both of frequency converters 56A and 56B.

Figure 5:
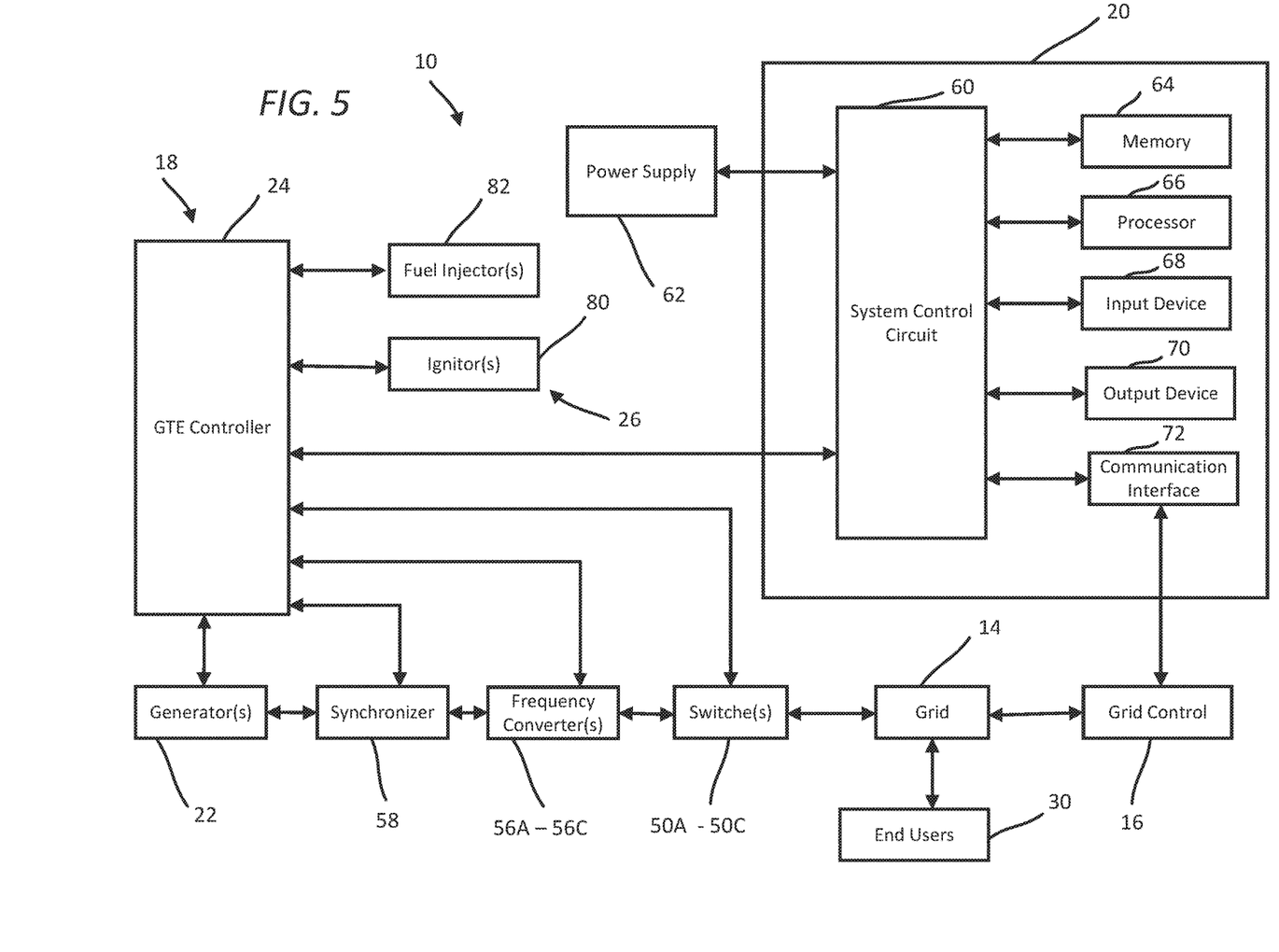
FIG. 5 is a schematic diagram illustrating a control system architecture for the power system of FIG. 1.

FIG. 5 is a schematic diagram illustrating components of power plant controller 20 and engine controller 24 for operating generator unit 18 of FIG. 1. Controller 20 can include circuit 60, power supply 62, memory 64, processor 66, input device 68, output device 70 and communication interface 72. Controller 20 can be in communication with grid controller 16, which can provide power to end users 30 via grid 14. Controller 20 can also be in communication with gas turbine engine controller 24. Engine controller 24 can be in communication with gas turbine 26 to control operation of gas turbine 26. For example, engine controller 24 can be configured to control the combustion process in combustor 38, which can alter the power output of gas turbine 26 to influence the power generated, speed of shaft 44, and the flow of exhaust gas E. To that end, engine controller 24 can be configured to operate one or more ignitors 80 and fuel injectors 82, frequency converters 56A-56C, synchronizers 58, and switches 50.

Grid controller 16, plant controller 20 and engine controller 24 can also include various computer system components that facilitate receiving and issuing electronic instructions, storing instructions, data and information, communicating with other devices, display devices, input devices, output devices and the like. Specifics of plant controller 20 are provided herein. However, further descriptions of grid controller 16 and engine controller 24 are omitted here for brevity. Grid controller 16 and engine controller 24 can include similar hardware components as plant controller 20.

Circuit 60 can comprise any suitable computer architecture such as microprocessors, chips and the like that allow memory 64, processor 66, input device 68, output device 70 and communication interface 72 to operate together. Power supply 62 can comprise any suitable method for providing electrical power to controller 20, such as AC or DC power supplies. Memory 64 can comprise any suitable memory device, such as random access memory, read only memory, flash memory, magnetic memory and optical memory. Input device 68 can comprise a keyboard, mouse, pointer, touch-screen and other suitable devices for providing a user input or other input to circuit 60 or memory 64. Output device 70 can comprise a display monitor, a viewing screen, a touch screen, a printer, a projector, an audio speaker and the like. Communication interface 72 can comprise devices for allowing circuit 60 and controller 20 to receive information from and transmit information to other computing devices, such as a modem, a router, an I/O interface, a bus, a local area network, a wide area network, the internet and the like.

Controller 16 can be configured to operate grid 14 and, as such, can be referred to the "home office" for power system 10. Grid 14 can comprise power plants 12A, 12B and 12C, high voltage transmission lines that carry power from distant sources to demand centers, and distribution lines that connect end users 30. As mentioned, power grids can be configured to operate at a control frequency where all power input into the grid from disparate sources in input at the same frequency to facilitate integration of the power. In an example, grid 14 can operate at a control frequency of 60 Hertz (Hz).

Controller 16 can determine the demand being placed on grid 14, such as by monitoring the consumption of end users 30. Controller 16 can coordinate generation of power from power plants 12A, 12B and 12C (FIG. 1). That is, controller 16 can assign or instruct each of power plants 12A, 12B and 12C whether or not to be on-line and how much power output they should contribute to grid 14, and such assignment may be dynamic and reactive based upon the capabilities and availability of any of the power plants 12A, 12B and 12C. Controller 16 can ensure that the total power generated by power plants 12A, 12B and 12C meets the power demand of end users 30. If power demand of end users 30 exceeds or is less than power supplied by power plants 12A, 12B and 12C, controller 16 can dictate response strategies for each of power plants 12A, 12B and 12C. For example, in the event of a power demand increase that exceeds the predicted operating band, controller 16 can ensure that each of power plants 12A, 12B and 12C responds so that only one or less than all of the power plants is prevented from bearing the burden of generating power for the deficiency. Likewise, controller 16 can instruct any or all of power plants 12A, 12B and 12C to come on-line or go off-line as needed, or via a predetermined schedule, to meet power demands. Thus, controller 16 can interface with a power plant controller for each of power plants 12A, 12B and 12C, like controller 20 for power plant 12A.

Controller 20 can be configured to operate power plant 12A. As mentioned, power plants 12B and 12C can be configured to operate with similar controllers as controller 20, but illustration and description is omitted. Circuit 60 can communicate with, that is, read from and write to, a memory device such as memory 64. Memory 64 can include various computer readable instructions for implementing operation of power plant 12A and generator unit 18. Thus, memory 64 can include instructions for monitoring requests from grid controller 16. Circuit 60 can be connected to various sensors to perform such functions. Memory 64 can also include information that can assist controller 20 in providing instruction to turbine controller 24. For example, memory 64 can include the type, size (capacity), age, maintenance history of gas turbine 26 and power plant 12A. Memory 64 can include various computer readable instructions for implementing operation of power plant 12A. Thus, memory 64 can include instructions for monitoring a power generation assignment from controller 16, instructions for power generation for engine controller 24, droop responses and imbalance responses for each of generator unit 18, start-up instructions (e.g., RPM ramp rates for fast starts and normal starts and associated instructions for components of gas turbine 26, such as ignitors 80 and fuel injectors 82, and the like. Memory for engine controller 24 can additionally be provided with instructions for operating gas turbine 26, such as fast start and normal start instructions.

Controller 20 can receive notifications of changes in steady state operation of power system 10 from controller 16. Controller 20 can also receive instructions from controller 16 to go off-line or come on-line to meet power demands.

In response to receiving instructions from controller 16 to meet power demands, controller 20 can issue instructions to, and receive inputs from engine controller 24 of gas turbine 26. For example, controller 20 can issue start and stop command signals to engine controller 24. Engine controller 24 can thus issue fast start or normal start instructions to components of gas turbine 26, such as fuel injectors 82, ignitors 80, switches 50A 50C and frequency converters 56A-56C. Additionally, instructions for a fast start and a normal start can be manually entered at a control panel, such as at an input device that includes a menu of start options. After starting of gas turbine 26, engine controller 24 can increase or decrease the power output by controlling the combustion process, such as by providing more or less fuel to combustor 38 with injectors 82. Increased or decreased power output of gas turbine 26 can correspond to increased or decreased speed of shaft 42.

Controller 20 can also issue instructions to engine controller 24 for operating gas turbine 26 in response to a load imbalance on grid 14 and changes between on-line and off-line operation such as scheduled high power usage and low power usage time frames, e.g., daytime and nighttime. Controller 16 for power system 10 can, in response to determining a transition to a high power usage time frame, issue instructions or power generation assignments to power plants 12A, 12B and 12C. The instructions can, for example, direct power plant 12A to come on-line and can be communicated from controller 16 to controller 20. Controller 20 can subsequently issue fast start or normal start instruction to controller 24. Controller 24 can subsequently provide instructions to various components of generator unit 18, such as fuel injectors 82 and ignitors 80. Controller 24 can additionally instruct switches 50A 50C and frequency converters 56A 56C to operate in the desired configuration for fast start or normal start, as discussed above with reference to FIGS. 4 and 5.

Figure 6:
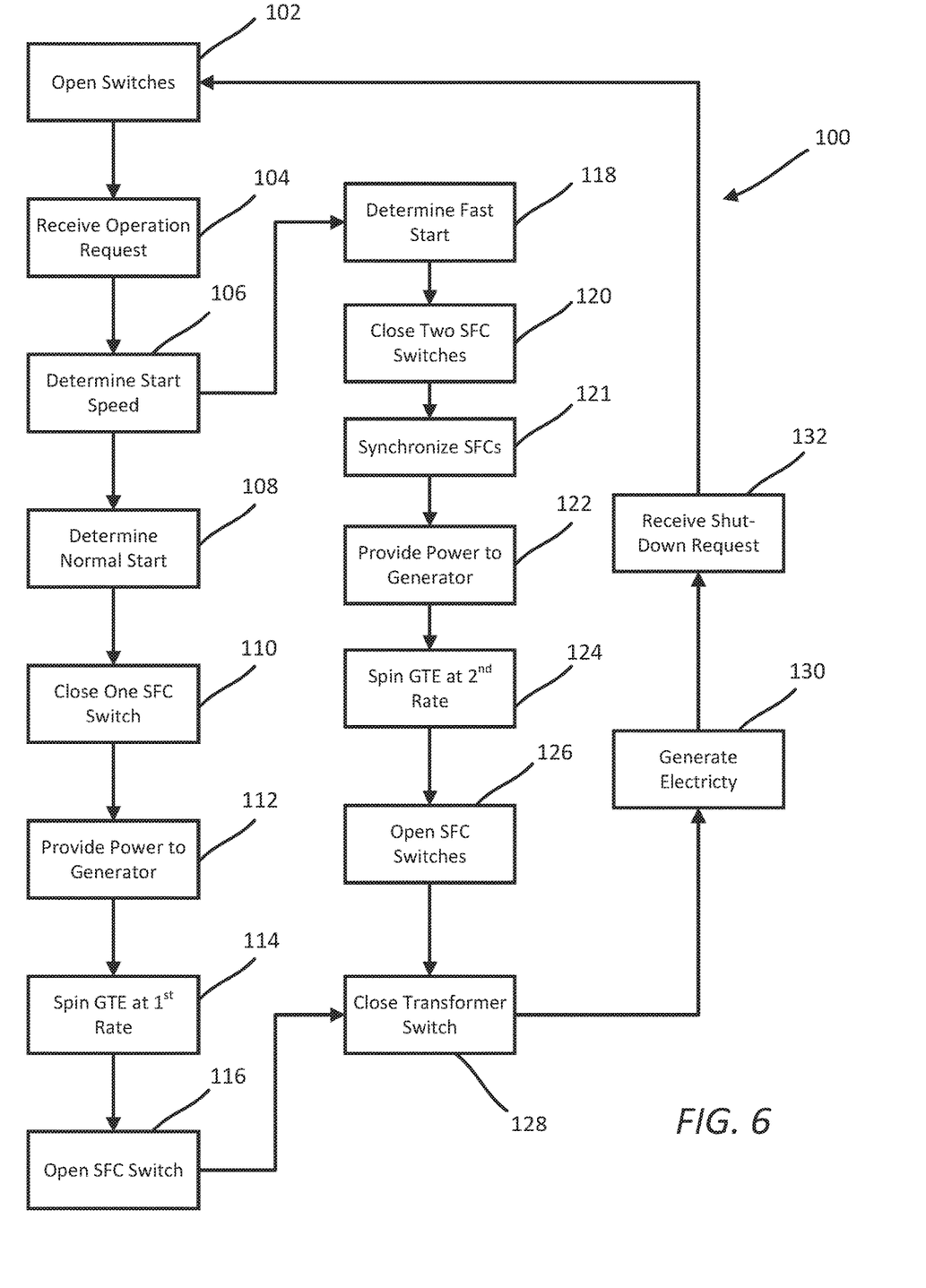
FIG. 6 is a schematic diagram illustrating methods for starting gas turbine engines according the present disclosure.

FIG. 6 is a line diagram illustrating method 100 for starting gas turbine engine 26 according the present disclosure. At step 102, switches 50A-50C can be opened such that generator unit 18 is in a powered-down or off configuration where shaft 44 of gas turbine 26 is not rotating.

At step 104, controller 24 for generator unit 18 can receive a start instruction from control 20 of power plant 12A, such as after grid controller 16 instructs power plant 12A to come on-line. At step 106, controller 24 can determine if the operation request requires a fast start or a normal start.

At step 108, a normal start can be determined where gas turbine 26 can be brought up to operational speed at a ramp rate that is both: 1) fast enough for grid controller 14 (e.g., fast enough to come on-line within the time window provided by grid controller 14); and 2) efficient for the operation of gas turbine 26 (e.g., at an efficient fuel burn rate and without unduly stressing components of gas turbine 26). A normal start versus a fast start is determined by the time it takes for a gas turbine engine to achieve a speed sufficient for independent operation. For example, a typical gas turbine engine can become independently operational at a generation speed of 2,700 RPM when the combustion process is capable of sustaining operation (even though the combustion process might begin, e.g., the ignitors produce flame between 600 to 1,000 RPM). Combustion can take the gas turbine engine to a fully operational speed of, for example, 3,600 RPM. In an example normal start, the rate of increase in the speed of shaft 42 can be an increase of four RPM per second, such as from 3 RPM up to 2,700 RPM over a period of approximately eleven minutes.

At step 110, engine controller 24 can direct one of switches 50B and 50C to close. Switch 50A and the other of switches 50B and 50C not closed can remain open. For discussion purposes, method 100 will be described as switch 50B being closed while switch 50C remains open at step 110.

At step 112, power from grid 14 can be directed to frequency converter 56A through switch 50B. The power, e.g., the electrical current, can flow to electric generator 22. As such, generator 22 can begin to operate as a motor and spin shaft 44.

At step 114, rotational power from shaft 44 can be transferred to shaft 42 of gas turbine 26. Power can be continuously delivered to generator 22 at an increasing frequency until gas turbine 26 is rotating at a speed sufficient to sustain combustion and thereafter to bring gas turbine 26 up to a speed sufficient to drive generator 22 at a speed that will generate electricity at the grid frequency, e.g., 60 Hz or 3600 RPM.

At step 116, when gas turbine shaft 42 is rotating at a sufficient speed, switch 50B can be opened. As such, generator 22 ceases to operate as a motor and converts to being driven by shaft 44 to operate as an electricity generator. In an example, switch 50B can be opened to take frequency converter 56A off line at a speed of shaft 42 of 2,700 RPM while combustor 38 can be used to take the speed of shaft 42 up to an operational speed of 3,600 RPM.

At step 128, switch 50A can be closed such that power from generator 22 can be delivered to grid 14 at the grid frequency through transformer 16 and switch 50A. In examples, switch 50A can be closed simultaneously as switch 50B is opened. In other examples, switch 50B can be opened first and switch 50A can close subsequently after output of generator 22 is synchronized to the grid 14.

At step 130, operation of gas turbine 26 can be maintained to deliver power to grid 14. Operation of gas turbine 26 can be maintained until controller 24 receives an instruction to the contrary, e.g., to stop generating electricity, from controller 20.

At step 132, controller 24 can receive an instruction from controller 20 to cease contributing power to grid 14. The stop can occur immediately or at a subsequent time that is determined in advance. Additionally, controller 24 can stop operation without a specific instruction from grid controller 20 such as at a predetermined, scheduled stop time or manually at a user interface. To begin stoppage of gas turbine 26, at step 132, controller 24 can issue instructions to the various components of gas turbine 26, such as fuel injectors 82 and ignitors 80, as well as switches 50A-50C to draw gas turbine 26 down to a non-operating or standby mode. In examples, method 100 can return to step 102 where all switches 50A-50C are open, gas turbine 26 is not rotating and electricity is not being produced at generator 22. As such, controller 24 can then be in a standby mode waiting for an instruction from controller 6 to begin operation or waiting for a scheduled start time.

At step 118, a fast start can be determined where gas turbine 26 can be brought up to operational speed at a ramp rate that is fast enough for grid controller 16 (e.g., fast enough to come on-line within the time window provided by grid controller 16) to meet grid conditions. As such, a fast start takes less time for gas turbine 26 to get up to a generational speed where combustion is sustainable, e.g., 2,700 RPM, than a normal start. In an example fast start, the rate of increase in the speed of shaft 42 can be an increase of nine RPM per second, such as from 3 RPM up to 2,700 RPM over a period of approximately five minutes.

At step 120, engine controller 24 can direct both of switches 50B and 50C to close. Switch 50A can remain open.

At step 121, engine controller 24 can direct synchronizer 58 to operate frequency converters 56A and 56B in synchronous operation. Synchronizer 58 can be operated before or after switches 50B and 50C are closed.

At step 122, power from grid 14 can be directed to frequency converters 56A and 56B through switches 50B and 50C. The power, e.g., the electrical current, can flow to electric generator 22. As such, generator 22 can begin to operate as a motor and spin shaft 44. As mentioned, synchronizer 58 can synchronize output of frequency converters 56A_ and 56B after switches 56A and 56B connect generator 22 to grid 14. As such, frequency converters 56A and 56B can connect to generator 22 while shaft 44 is at a constant speed or while shaft 44 is accelerating.

At step 124, rotational power from shaft 44 can be transferred to shaft 42 of gas turbine 26. Power can be continuously delivered to generator 22 at an increasing frequency until gas turbine 26 is rotating at a speed sufficient to sustain combustion and thereafter to bring gas turbine 26 up to a speed sufficient to drive generator 22 at a speed that will generate electricity at the grid frequency, e.g., 60 Hz or 3600 RPM.

At step 126, when gas turbine 26 is rotating shaft 42 at a sufficient speed, switches 50B and 50 can be opened. As such, generator 22 ceases to operate as a motor and converts to being driven by shaft 44 to operate as an electricity generator.

At step 128, switch 50A can be closed such that power from generator 22 can be delivered to grid 14 at the grid frequency through transformer 52 and switch 50A. In examples, switch 501 can be closed only after switches 50B and 50C are opened.

Subsequently, steps 130 and 132 can be repeated, as described above, to return method 100 to step 102.

The installation and operational benefit of the systems and methods of the present disclosure can be in the form of, for example, 1) a decrease in installation costs due to needing to install less start-up capacity in frequency converters 56A-56C (with smaller capacity frequency converters generally being less expensive than larger capacity frequency converters due to, for example, smaller components, interconnecting circuits, etc.), and 2) reduced maintenance costs associated with not having to maintain excess capacity of frequency converters 56A-56C, relative to frequency converters 54A and 54B.

Various Notes

The above detailed description includes references to the accompanying drawings, which form a part of the detailed description. The drawings show, by way of illustration, specific embodiments in which the invention can be practiced. These embodiments are also referred to herein as "examples," Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for starting a gas turbine engine, the method comprising:
    electrically decoupling a generator configured to be driven by the gas turbine engine from a direct coupling to a power supply;
    controlling power from the power supply to a first static frequency converter, the first static frequency converter having a first capacity;
    controlling power from the power supply to a second static frequency converter, the second static frequency converter having a second capacity; and
    operating the generator as a starter-motor with power from either of:
        the first static frequency converter only to turn the gas turbine engine at a first rate sufficient to start the gas turbine engine within a first time period without use of the second static frequency converter; and
        the first static frequency converter and the second static frequency converter simultaneously to turn the gas turbine engine at a second rate greater than the first rate.

2. The method of claim 1, wherein the first capacity is equal to the second capacity.

3. The method of claim 1, wherein the second rate is double the first rate.

4. The method of claim 1, wherein turning the gas turbine engine at the second rate results in starting the gas turbine engine within a second time period less than the first time period.

5. The method of claim 1, wherein electrically decoupling the generator from the power supply comprises opening a first switch connecting the power supply and the electric generator.

6. The method of claim 5, wherein controlling power from the power supply to the first static frequency converter comprises operating a second switch coupling the first static frequency converter to the generator.

7. The method of claim 6, wherein controlling power from the power supply to the second static frequency converter comprises operating a third switch coupling the second stat frequency converter to the generator.

8. The method of claim 1, further comprising synchronizing frequency output of the first static frequency converter and the second static frequency converter before or after electrically coupling the first and second static frequency converters to the generator.

9. The method of claim 1, further comprising:
    controlling power from the power supply to a third static frequency converter using a fourth switch, the third static frequency converter having a third capacity equal to the first and second capacities.

10. A method for fast-starting a gas turbine engine configured to drive a generator to supply alternating current (AC) power to a distributed grid network configured to deliver power to different end-users, the method comprising:
    providing power from the grid to a first static frequency converter, the first static frequency converter having a first capacity;
    providing power from the grid to a second static frequency converter, the second static frequency converter having a second capacity;
    synchronizing output of the first and second static frequency converters;
    operating the generator as a starter-motor with power from the first static frequency converter and the second static frequency converter simultaneously to turn the gas turbine engine at a first rate sufficient to start the gas turbine engine within a first time period;
    wherein:
        the first rate is greater than a second rate sufficient to start the gas turbine engine within a second time period using only one of the first and second static frequency converters; and
        the first time period is shorter than the second time period; and
    providing power to the distributed grid network with the generator under power from the gas turbine engine.

11. The method of claim 10, wherein the second capacity is equal to the first capacity.

12. The method of claim 10, further comprising:
    electrically decoupling the generator and a transformer from a direct coupling to the power of the grid while operating the generator as a starter-motor.

13. The method of claim 12, further comprising:
    starting a simple-cycle power plant with the gas turbine engine;
    electrically decoupling the first and second static frequency converters from the power of the grid; and
    electrically coupling the generator and the transformer to the grid.

14. The method of claim 10, wherein the first static frequency converter and the second static frequency converter are directly connected to the generator.

15. A gas turbine engine system comprising:
    a gas turbine engine;
    a generator configured to be driven by the gas turbine engine to supply power to a grid system;
    a first switch to electrically couple and decouple the generator from the grid system;
    a first static frequency converter having a first capacity;
    a second switch to electrically couple and decouple the first static frequency converter from a generator input for the generator;

a second static frequency converter having a second capacity;

a third switch to electrically couple and decouple the second static frequency converter from the generator input for the generator;

a synchronizer to synchronize output of the first and second static frequency converters; and a controller configured to:
  electrically couple and decouple the first and second static frequency converters from the grid system;
  control synchronization of the first and second static frequency converters; and
  alternatively operate the generator as a starter-motor with power from:
    the first static frequency converter only to turn the gas turbine engine at a first rate sufficient to start the gas turbine engine within a first time period without use of the second static frequency converter; or
    the first static frequency converter and the second static frequency converter simultaneously to turn the gas turbine engine at a second rate greater than the first rate.

16. The system of claim 15, wherein the controller includes a memory device comprising a non-transient computer storage medium including instructions to control a second switch and a third switch for controlling and synchronizing the first and second frequency converters, respectively.

17. The system of claim 16, further comprising an operator input including a menu of options to start the gas turbine engine including:
  a normal start option to turn the gas turbine engine at the first rate by closing one of the second and third switches; and
  a fast start option to turn the gas turbine engine at the second rate by closing both of the second and third switches.

18. The system of claim 15, further comprising a transformer positioned between the generator and the first switch.

19. The system of claim 15, wherein the gas turbine engine comprises a single-shaft system that is part of a simple-cycle power plant.

20. The method of claim 15, wherein the second switch and the third switch are connected to the generator in the same fashion.

* * * * *